United States Patent [19]
Burklund et al.

[11] 3,893,367
[45] July 8, 1975

[54] MECHANICALLY INITIATED IGNITER

[75] Inventors: Vernon D. Burklund, China Lake; Joseph A. Schmidt, Ridgecrest; Michael D. Jacobson, Inyokern, all of Calif.

[73] Assignee: The United States of America as represented by the Secretary of the Navy, Washington, D.C.

[22] Filed: June 10, 1974

[21] Appl. No.: 478,010

[52] U.S. Cl............ 89/27 R; 244/122 AD; 244/141
[51] Int. Cl.²........................................... F41F 15/00
[58] Field of Search......... 244/141, 122 AD, 122 R; 60/256; 82/1 B, 1 D, 27 R; 102/77, 64, 65 R, 65.4, 70 R, 81.6; 42/1 F, 1 G, 1 H, 1 Z

[56] References Cited
UNITED STATES PATENTS
2,751,171 6/1956 Martin ................................ 244/141
2,780,961 2/1957 Musser et al...................... 89/1 B X Primary Examiner—Trygve M. Blix
Assistant Examiner—Paul E. Sauberer
Attorney, Agent, or Firm—R. S. Sciascia; Roy Miller; Robert F. Beers

[57] ABSTRACT

An igniter mechanism for a rocket motor utilized for towing a load or extracting an aircrew member from an aircraft. The mechanism is operated by establishing a predetermined load on a tow line that is physically attached to the rear end of a rocket motor by shearing the first element to allow rearward travel of a centrally located piston head attached to a stud. As the shaft travels rearwardly a force biases a spring loaded firing pin or pins. Whenever the rearward force exceeds a predetermined force and before the piston is limited in travel a second element shears allowing a firing pin to move forward due to loading on the firing pin springs. The pin or pins strike percussion elements with sufficient force to ignite an igniter to start burning of the rocket propellant within rocket motor housing.

4 Claims, 2 Drawing Figures

MECHANICALLY INITIATED IGNITER

CROSS REFERENCE TO RELATED APPLICATIONS

Reference is made to Assignees' copending applications Ser. Nos. 478,011, 478,008, 478,012 and 478,009,filed June 10, 1974, which all relate to a rocket motor apparatus.

BACKGROUND OF THE INVENTION

1. Field of the Invention

This invention relates to a mechanical igniter mechanism for use in a rocket motor apparatus adapted to tow a load fastened to the rear end of the rocket motor by means of a tow line.

2. Background of the Invention

Igniter switch mechanisms, especially those for use in rocket motors, in many instances require precise timing to positively ignite the propellant for powered rocket flight at a given time after, for example, a sequence of operations. This is especially the case when extracting an aircrew member from an aircraft by a powered rocket, where ignition of the rocket takes place a predetermined time after its launch. These requirments necessitate exact timing to prevent tow line breakage or an erratic trajectory during powered flight of the rocket motor.

Due to the need in recent years for lighter, simpler and more effective rocket motors for providing a variety of tasks, for example, carrying a line, towing a load or extracting a crew member to a safe distance from a disabled aircraft, it has been necessary to provide the rocket with a safe, simple, economical ignition system that is positive acting under all types of environmental conditions.

Prior art techniques are designed with relatively complex safety features since most rockets require only very low pull forces to cock and release a firing pin to ignite the rocket propellant. These devices are usually not activated by a force on a tow line but by some other means remote from the rocket motor. This normally necessitates additional lanyards, static lines, electric wiring, powder trains or the like which could affect rocket ignition reliability in situations where there is a need for positive ignition within a given period of time after rocket launch in order that proper powered rocket flight is established. Any abnormal delay in ignition could result in an erratic rocket trajectory during powered flight that could be dangerous to the air crew member ejecting from an aircraft.

The present unique ignition mechanism is a positive mechanically operating device that depends on a predetermined pulling force exerted by the tow line to actuate ignition. The mechanism overcomes the inherent disadvantages of present complex rocket ignition systems by providing a mechanism that is simple and foolproof in operation.

SUMMARY OF THE INVENTION

A feature of the invention is to provide a simple, foolproof ignition system that operates only when there is a predetermined pull on the tow line and that is economical and easy to fabricate.

The igniter assembly is positioned in a housing at the nozzle end of the rocket motor and is actuated by a force on the tow line. The tow line force is created by tow line stretch at time of rocket motor launch. When sufficient force is established a piston-like element shears a first pin to allow sufficient rearward piston travel to bias or cock the firing pins. As the pulling force continues, a second pin shears releasing the firing pins which move forward because of the spring bias to explode percussion caps, thus initiating a booster charge that ignites the rocket motor propellant.

BRIEF DESCRIPTION OF THE DRAWINGS

Referring now to FIG. 1 of the drawing, there is illustrated an igniter assembly positioned at the rear of rocket 10 in rocket nozzle assembly 20 which is provided with a threaded portion for attachment of a tow line shackle 58. Nozzle assembly 20 fits within the end of the rocket casing and is held rigidly in place by a locking element 13. An O-ring sealing means is provided to prevent escape of gases between nozzle assembly 20 and the inner wall of the rocket casing.

Figure 1:
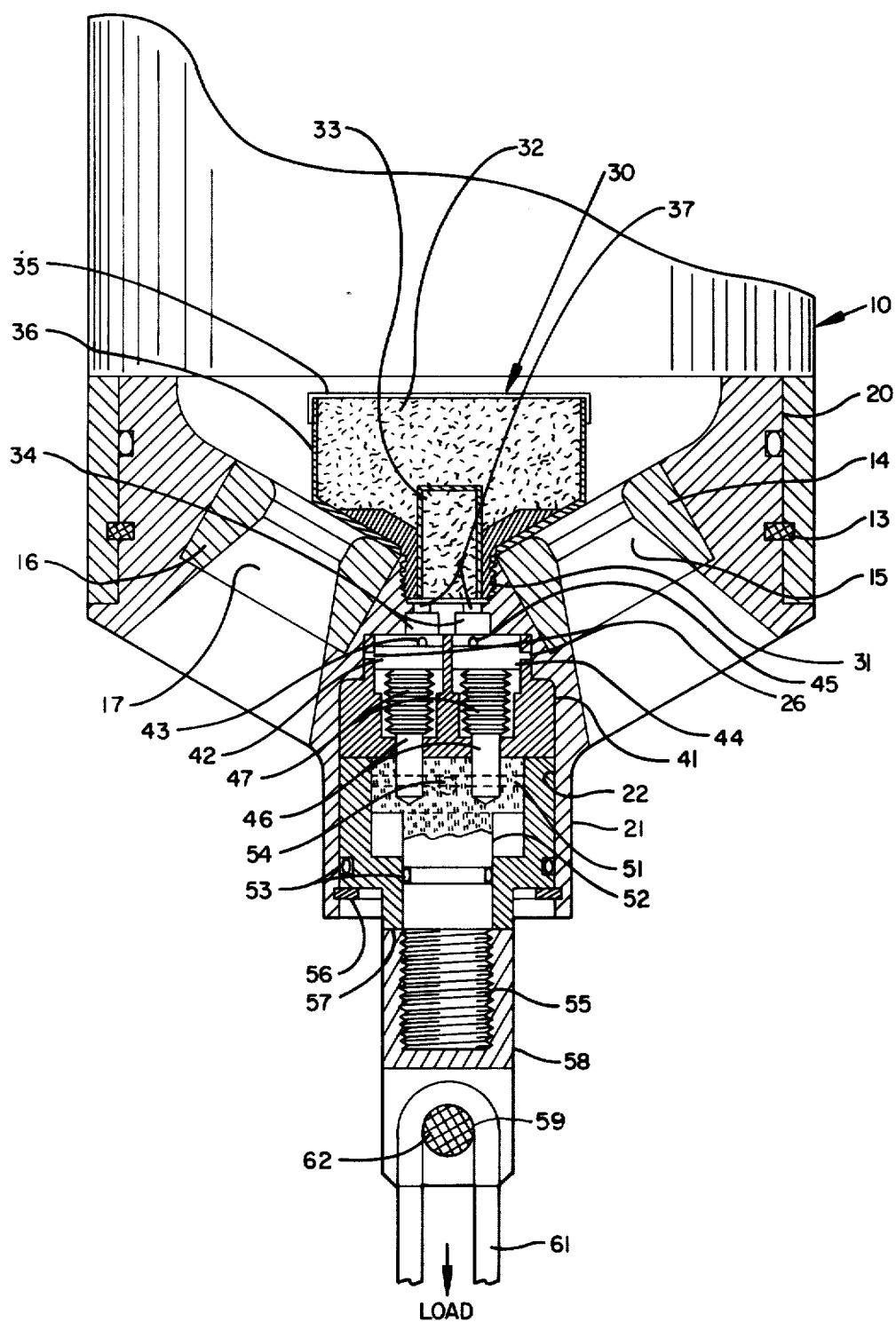
FIG. 1 illustrates a cross-sectional view of the igniter assembly positioned in a rocket motor.
Figure 2:
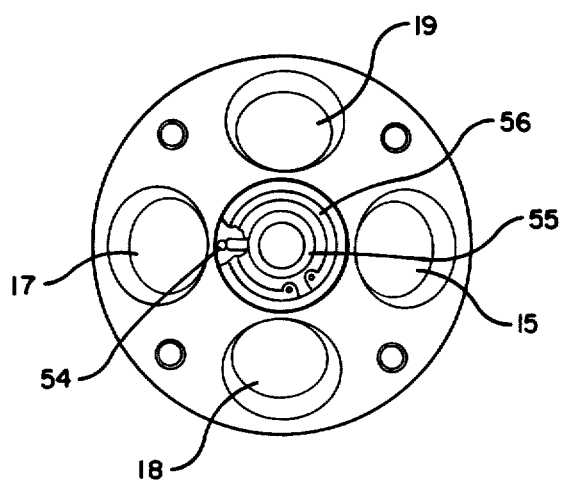
FIG. 2 is an end view of the rocket motor.

Rocket nozzle assembly 20 has a plurality of rocket apertures 15, 17, 18 and 19 positioned symmetrically about the longitudinal axis of the rocket motor 10. Each rocket nozzle has a rocket nozzle insert such as 14 and 16 of suitable internal shape and material fitted in each aperture. At the center of rocket nozzle assembly 20 is a boss 21 having an axially bored out portion defining chamber 22 for containing firing pin assembly 41 and annular piston housing 57. A compressible locking ring or clip 56 holds both assemblies securely within chamber 22 by partially engaging a groove on an inner wall and by bearing against a face portion of annular piston chamber 57.

Booster propellant assembly container 30 is attached by means of threads 31 in the top portion of nozzle housing assembly 20. A rapidly burning powder 32 positioned within the container surrounds a centrally located transfer charge 33. Container 30 is closed by means of a cap 35. Walls 36 and cap 35 are constructed of a thin lightweight material.

Percussion or stab primers 34 are positioned in two small chambers in the nozzle assembly 20. Two smaller bores 37 allow communication between percussion primers 34 and the bottom portion of transfer charge 33.

Firing pin assembly 41 is shown having two parallel stepped bores extending from its top surface to its bottom surface, but it is to be understood that a single stepped bore could be used with a single firing pin. The use of redundant firing pins may be necessary where additional safety factor is desired. Cylindrical firing pin heads 42, 44 respectively slidably move in the first stepped bore postioned adjacent percussion primers 34. Off center firing pin nibs 43, 45 respectively project from the top surface of firing pin heads 42 and 44. Attached to the opposite surface of each firing pin head are shafts 46 fitted for slidable movement within the outermost stepped bore. A plurality of spring-like concave washers 47 are assembled around each of the shafts 46 for providing spring bias to the assembly. Washers 47 are operatively held within the intermediate stepped bore portion of firing pin housing 41. Slots or grooves cut in each wall of the bore containing the piston heads cooperate with guide pins 26 to properly position firing nibs 45 in line with percussion primers 34.

Annular piston housing 57 is fitted with chamber 22 to provide support and guide means for piston member 52 that is formed with a generally cylindrical head portion fastened to a stud shaft portion. The piston head has two off center bores extending a substantial distance into the head body. A shear pin 51 extends across the piston head portion and through the lower portion of firing pin shafts 46. A second shear pin 54 positioned orthogonal to pin 51 extends through piston head portion of piston element 52 and through the walls of annular piston guide member 57. Shear pin 54 holds piston element 52 from movement within piston guide members 57. Seals 53 are placed about piston shaft 52 and the outer periphery of piston guide member 57 to provide sealing at these points. A clip 56 bearing against a shoulder formed in piston guide member 57 holds the elements within chamber 22.

Shackle 58 having a forked lower section with holes 59 is held to piston member 52 be means of threads 55. Tow line 61 is fitted through the forked arms and supported by pin 62. Tow line 61 extends to couple to a load or man not shown.

In operation, rocket 10 is forcibly launched from a launcher mechanism not shown. Tow line 61 stretches to support a load placing a pulling force on the line caused by the upward velocity of the motor and the weight of the load. When this force exceeds a predetermined number of pounds, shear pin 54 breaks allowing piston head to travel in the direction of the pulling force exerted on tow line 61. Movement of piston element 52 causes firing pin heads 42, 44 to move against bias washers 47 compressing them until sufficient force causes shear pin 51 to break allowing piston heads 42, 44 to move in the opposite direction under influence of force from bias washers 47 to drive nibs 43, 45 into percussion primers 34. Explosion of the primers ignites transfer charge 33 which in turn fires booster charge 32 igniting the rocket propellant within motor 10.

Burning of the propellant consumes portions of the case of booster charge 30 not already consumed in booster charge combustion to allow free flow of propellant gases through nozzles 15, 17, 18 and 19 for powered rocket flight. The load towed by line 61 is carried a predetermined distance dependent upon rocket propellant charge and load weight.

As pointed out above, the igniter assembly may be used in rocket escape apparatus to remove aircrew members from a disabled aircraft. In its initial state, the mechanism is uncocked and held against movement by shear pin 54. The force necessary to break this pin is sufficiently great to prevent cocking of the firing pin assembly inadvertent tugs or pulling of tow line 61. Because cocking requires a large force, no further safety mechanisms are needed and the igniter mechanism remains simple but foolproof in operation.

What is claimed is:

1. A propellant ignition mechanism for a rocket motor utilized to tow a load by means of a tow line fastened concentric with the center of the rocket motor and rearward of the nozzles comprising:
   a chamber having an intermediate counter bore and axially rearwardly disposed bore with the center lying on a line through the longitudinal axis of the rocket motor;
   first guide member formed into a piston chamber with a necked down collar positioned within said chamber;
   piston means having a first shear pin for holding said piston means from operative movement within said guide member;
   firing pin guide means extending through the top surface and a substantial distance into the body of said piston means;
   firing pin means in slidable engagement with said firing pin guide means and held immovable by second shear pin means;
   bias means operatively attached to said firing pin means to oppose a pulling force urging said psiton means in a rearward direction; and
   ignition means positioned adjacent said firing pin means;
   whereby a rearward pull of a first predetermined force on the piston means shears the first shear pin to allow the piston means to move against the opposing motion of the basing means until a second predetermined force is exceeded to break the second shear pin means and allow the firing pin means to be driven against the ignition means.

2. The propellant ignition mechanism of claim 1 wherein said piston means has a substantially thick head portion that has its circumferential edge in slidable engagement with the inner wall of said piston chamber.

3. The propellant ignition mechanism of claim 1 wherein said bias means is a plurality of spring washers formed with concave depressions positioned on the firing pin shaft.

4. The propellant ignition mechanism of claim 1 wherein said firing pin means comprises:
   a rounded substantially thick head portion having an offset protruding element extending perpendicular to the upper surface of said head portion;
   a relatively long thin shaft member fastened to the lower face of said head portion and having its longitudinal axis concentric with the center of said head portion; and
   guide pins positioned to extend orthogonally from the circumferential surface of said head portion.

* * * * *